3,337,435
METHOD OF PREPARING CARBOXYLIC ACID SALTS OF FLUORO TELOMERS
Robert N. Haszeldine, Cambridge, England, assignor to Pennsalt Chemicals Corporation, Philadelphia, Pa., a corporation of Pennsylvania
No Drawing. Filed Aug. 2, 1955, Ser. No. 526,086
Claims priority, application Great Britain, Aug. 9, 1954, 23,106/54
2 Claims. (Cl. 204—158)

This invention pertains to the preparation of novel fluorinated polymers and adducts and to the conversion of such polymers and adducts into novel and useful derivatives.

In recent years an increasing interest has arisen in fluorinated compounds of various types. Such compounds have been useful in many applications, for example, in elastomers and in greases and lubricants for use under conditions of high pressure and temperature.

Use of these compounds has, however, been limited by the fact that in many cases they are difficult to prepare, requiring expensive reagents and techniques not well suited to industrial scale operation.

It is one object of the present invention to provide novel fluorinated compounds, particularly polymers which are stable to heat, light and chemical attack, which can be made easily without expensive reagents. Further objects of the invention include the provision of unsaturated fluorinated compounds, fluorinated carboxylic acids and sulphonated fluoro compounds.

In accordance with the invention, fluorinated polymers or adducts are made by a novel method which involves reacting a fluoroalkene or fluoropolyene with a perhalogeno-ethane having the general formula:

$$CF_2XCClYZ$$

where X is chlorine or bromine, preferably chlorine, Y is chlorine or fluorine, preferably fluorine, and Z is bromine or iodine, preferably iodine. The reaction may be written $$n(CF_2XCClYZ) + m(R) \rightarrow n(CF_2XCClY)m(R)n(Z)$$

where X, Y and Z are as defined above, R is fluoroalkene or fluoropolyene, where, when R is fluoroalkene, $n$ is unity and $m$ is an integer not greater than 40 and usually not greater than 20, $m$ preferably being an integer from 4 to 10, and where, when R is fluoropolyene, $n$ is an integer not greater than 20 and $m$ is an integer not greater than 30.

Among the perhalogeno-ethanes usable in the above reaction are the compounds $CF_2ClCFClI$, $CF_2BrCFClI$, $CF_2BrCCl_2I$, $CF_2ClCCl_2I$, and $CF_2ClCFClBr$. The fluoroalkenes used are those capable of forming telomers in the presence of a peroxide initiator, e.g. fluoroalkenes of the type $CF_2=CHY'$ and $CF_2=CFY'$ where $Y'=F$, Cl, Br or I; fluoroalkenes of the type $R'CF=CF_2$, where $R'=$alkyl, polyhalogeno-alkyl, particularly perfluoro- or perfluorochloro-alkyl; and the individual fluoroalkenes $CF_2=CCl_2$, $CH_2=CHF$, $CH_2=CF_2$ and $CHF=CF_2$. On grounds of availability the following fluoroalkenes are of particular importance, viz: $CF_2=CF_2$, $CF_2=CFCl$, $$CF_2=CCl_2, CF_2=CHCl, CH_2=CHF, CH_2=CF_2$$

$$CHF=CF_2$$

(all of which add head-to-tail as exemplified later for $CF_2=CFCl$) and fluoroalkenes of the type $$CF_3(CF_2)_{n'}CF=CF_2$$

where $n'$ is an integer not greater than 20. Among the fluoropolyenes which may be used are $CF_2=CFCF=CF_2$ or any polyfluorobutadiene. Whether a 1:1 adduct, a short chain polymer, or a long chain polymer will result, will, of course, depend upon the particular unsaturated compounds employed in the reaction. Thus, for example, when tetrafluoroethylene is used a long chain polymer will result, when trifluorochloroethylene is used a short chain polymer will be produced, and when a compound of the formula $CF_3(CF_2)_{n'}CF=CF_2$ is used the product will either be a 1:1 adduct or a short chain polymer.

The higher molecular weight polymerisation products yielded by the above described reaction are either oils, greases, waxes or resins. These products, particularly those prepared from highly fluorinated unsaturated compounds and to a lesser extent those prepared from fluorinated unsaturated starting compounds containing some chlorine or hydrogen in addition to fluorine, are of importance because, as described in more detail later, they may be readily converted by chlorination or fluorination to liquid and solid products which are stable to heat, light and chemical attack whether by oxidizing agents, reducing agents, acids or alkalis. The stable products thus produced are particularly useful as lubricants; for example, compounds of this type have been used to lubricate the agitator in an autoclave for fluorination reactions.

The new polymerisation reaction is of particular utility in that the degree of polymerisation can be readily controlled by adjusting the proportion of the chain transfer agent used, viz: the compound $CF_2XCClYZ$. Thus, by using a sufficient concentration of the chain transfer agent, the formation of solid polymers may be prevented or reduced.

Exemplary of the polymerisation reaction described above, and in particular of a reaction which yields a product which is stable in the sense just mentioned, is the reaction of the two commercially available compounds $CF_2ClCFClI$ and $CF_2=CFCl$ to give polymers of the type $CF_2ClCFCl—(CF_2CFCl)_nCF_2CFClI$, which reaction can be shown as follows:

$$CF_2ClCFClI \rightarrow CF_2ClCFCl— + I—CF_2ClCFCl—$$
$$+ CF_2=CFCl \rightarrow CF_2ClCFClCF_2CFCl—$$
etc.

$$CF_2ClCFClCF_2CFCl— + CF_2ClCFClI$$
$$\rightarrow Cl(CF_2CFCl)_2I + CF_2ClCFCl—$$
etc.

The product of this reaction may then readily and cheaply be converted in high yield to a stable oil, grease or wax by replacing the terminal iodine atom with chlorine. Alternatively, the product can be rendered stable by replacing the terminal iodine atom with fluorine, e.g., by fluorination with free fluorine, halogen fluorides such as $ClF_3$, or metallic fluorides such as $CoF_3$ and $AgF_2$, but this procedure is not preferred because it is more expensive than chlorination.

The polymerisation process of the invention, which provides stable products of the desired chain length and which is exemplified above, represents a substantial improvement over present commercially available methods. In previously known methods for preparing fluoro polymers, the oils and greases initially produced do not possess the desired chemical and thermal stability and in many cases require fluorination with, for example, cobalt trifluoride or silver difluoride, a step which is costly and which results in an appreciable decrease in the yield of stable polymers.

The new polymerisation and addition reaction described may be carried out in a variety of ways. In general, it is only necessary to subject the reactants to some agency which will cause the perhalogeno-ethane to form the free radical ($CF_2XCClY—$). This may be accomplished, for eaxmple, through the use of ultraviolet light, heat and ultraviolet light, an initiator with or without heat, a radioactive initiator, or heat alone.

Those methods which do not use ultraviolet light are particularly valuable for large scale production since the quartz apparatus required for ultraviolet techniques is difficult to adapt to industrial scale operation.

When ultraviolet light is used, temperature is not critical and the reaction may be conducted at room temperature or any other convenient temperature.

When an initiator is used, the particular compound chosen is one which will form free radicals under the conditions of the reaction and which is compatible with the reactants and the products of the reaction. Examples of suitable initiators are the peroxide compounds such as, for example, benzoyl peroxide, acetyl peroxide, hexachloroacetyl peroxide, hexafluoroacetyl peroxide and di-tert-butyl peroxide. Other compounds such as the azo compounds, for example, $\alpha,\alpha'$-azo-diisobutyronitrile and the diazo compounds such as diazomethane are also suitable as initiators. It is to be noted that the initiators employed do not appear in the polymer or addition products as is the case in some polymerisation reactions. This fact is attributable to the preferential affinity between the initiator and the perhalogeno-ethane chain transfer agent and is, of course, advantageous from the standpoint of the stability of the product polymer or adduct.

When an initiator is used, the reaction should be conducted at a temperature such that the initiator will form free radicals. This temperature may be room temperature or even lower but is usually between about 60° C. and about 150° C.

Where heat alone is used, the temperature must be sufficient to cause the reactants themselves to form free radicals. Thus the temperature will vary widely with the particular reactants but will generally be in excess of 150° C., except where unusually reactive materials, such as those having fluorine, iodine and halogen on the same carbon atom are used. The method using heat alone is of particular value since products may be obtained which are uncontaminated by even traces of hydrogen and which are therefore capable of conversion into products of maximum stability.

In the above methods of initiating the polymerisation or addition reactions, pressure is not significant except that if short chain polymeric products are desired, the pressure should be sufficient to keep the materials in the liquid state. This pressure will vary widely with the reactants. Reaction time is a variable factor and will depend on the particular reactants, the temperature and the degree of polymerisation desired.

In accordance with yet another aspect of this invention, certain of the polymers and 1:1 adducts described in the early part of this specification, may be oxidized to acyl halides or the corresponding carboxylic acids by a method using molecular oxygen and conditions conducive to the formation of free radicals from the product to be oxidized.

While the polymers and adducts subjected to the oxidation reaction with molecular oxygen are of the above described general types:

$$n(CF_2XCClY)m(R)nZ$$

and $$n(CF_2XCClY)m(R)nCl$$

they must, since such oxidation recation is essentially one involving only the terminal groups containing the "Z" (or corresponding Cl) atoms in the formulae given, also be such that no part of the chain thereof is oxidisable more readily than the terminal carbon atoms to which the Z or Cl atoms are attached, and the suitability in this respect of any given polymer or adduct will depend on the precise fluoroalkene or fluoro polyene units present. By way of further guidance, it may be stated that this oxidation reaction is particularly suited to telomers represented as $R^1CPQZ_1$ in which $R^1$ represents the main chain of the telomer, such chain being less prone to oxidation than the terminal group $—CPQZ_1$, $Z_1$ represents chlorine, bromine or iodine, preferably bromine or iodine, and P and Q each represent a halogen of no greater atomic weight than that of $Z_1$. In products prepared from fluoroalkenes, the fluoroalkene units may suitably be provided by alkenes containing at least one fluorine atom and represented as $CR_2R_3:CP_1Q_1$, where $R_2$ and $R_3$ are halogen, halogenoalkyl, alkyl or hydrogen, $P_1$ is F, Cl or Br, and $Q_1$ is Cl or Br, it being understood that the alkene must also be such that the addition of units thereof takes place the correct way around, namely, so as to provide a terminal group of the type $CR_2R_3·CP_1Q_1Z$ where Z as hitherto represents iodine or bromine. Specific fluoroalkenes which may be used to provide polymers susceptible to the oxidation reaction of the invention without undergoing chain disintegration are the compounds $CF_2:CFCl$; $CF_2:CFBr$ and $CF_2:CCl_2$.

Subject to the above provisos as to the polymers and adducts which may be oxidised with molecular oxygen under conditions conducive to free radical formation, there may, for example, be produced carboxylic acids of the following type, viz:

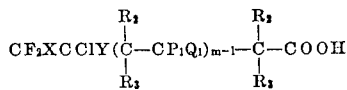

were X, Y and $m$ are as defined in the early part of this specification and $R_2$, $R_3$, $P_1$ and $Q_1$ are as defined in the preceding paragraph.

When the starting compound to be oxidised is prepared from a fluoropolyene, i.e. when the starting compound is of the type

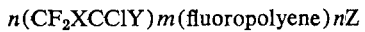

or

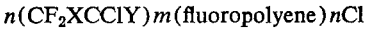

the same principles apply and the carboxylic acids may be obtained which have the general formula

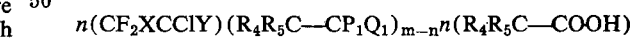

where X, Y, $n$ and $m$ are as defined in the early part of this specification, where $P_1$ and $Q_1$ are as above, and where $R_4$ is alkyl, halogen-alkyl, alkenyl, halogeno-alkenyl, polyenyl or halogeno-polyenyl, $R_5$ is halogen, hydrogen, alkyl, halogeno-alkyl, alkenyl, halogeno-alkenyl, polyenyl or halogeno-polyenyl; and where $R_4$ and $R_5$ taken together contain at least one unsaturated linkage. As just employed the term "polyenyl" denotes a hydrocarbon radical having more than one unsaturated linkage.

From the preceding description it will be seen that the class of carboxylic acids provided by molecular oxidation method may be described as having the general formula

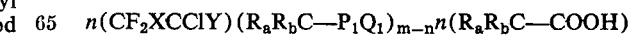

where the portion $(R_aR_bC—CP_1Q_1)$ taken as a whole is fluoroalkene or fluoropolyene, where when it is fluoroalkene $R_a$ and $R_b$ have the values of $R_2$ and $R_3$ above, and where when it is polyene $R_a$ and $R_b$ have the values of $R_4$ and $R_5$ above.

This oxidation method may be carried out using oxygen and ultraviolet light with or without heat, oxygen together with heat and an initiator such as peroxide, or heat alone together with oxygen. When ultraviolet light is used the reaction temperature will usually range from room temperature to about 100° C. and when heat alone is used to initiate free radical formation, higher temperatures will be necesary, e.g. about 100° C. or higher.

When the oxidation is carried out under anhydrous conditions, acyl halides are formed which may have the general formulae

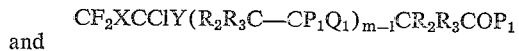
and
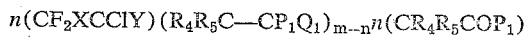

These halides may be hydrolysed to the corresponding acids or reacted with an alcohol to form esters.

When the oxidation is carried out in the presence of a base, the product is a salt of the carboxylic acid. Thus when sodium hydroxide is used, as is preferred, the following sodium salts may be formed, viz:

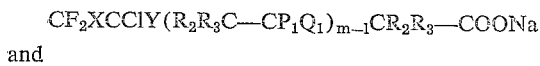
and

It will be noted that the carboxylic acids produced by this method using molecular oxygen are different from those produced by dehalogenating the polymers and adducts to produce terminally unsaturated compounds followed by oxidation, e.g. as with $KMnO_4$. In the present instance the carboxylic acids are those resulting from oxidation of the end of the polymer chain initially containing the Z constituent. This distinction may be drawn as follows:

(3) Still residue consisting of longer chain polymer (see below), 20 percent.

*Example A2.—Using ultraviolet light and equimolar amounts of $CF_2ClCFClI$ and $CF_2=CFCl$*

The above experiment was repeated, using 69.7 parts of $CF_2ClCFClI$ and 29.2 parts of $CF_2=CFCl$. The course of the reaction could be followed by the increase in viscosity, and in some runs a solvent ($CF_2ClCFCl_2$) was used to prevent oily polymer from sticking to the sides of the tube and being decomposed by photolysis. Irradiation time: 2 to 7 days.

The products were:
(1) Unchanged $CF_2ClCFClI$.
(2) $Cl(CF_2CFCl)_2I$, 18 percent, B.P. 78 to 80° C./20 mm. Hg absolute.
(3) $Cl(CF_2CFCl)_3I$, 14 percent, B.P. 140 to 142° C./30 mm. Hg absolute. Found: C, 14.1 percent; (Cl+I), 52.5 percent. Required: C, 14.1 percent; (Cl+I), 52.2 percent.
(4) $Cl(CF_2CFCl)_4I$, 17 percent, B.P. 135 to 140° C./ca. $10^{-1}$ mm. Hg absolute. $n_D^{20}$ 1.435. Found: C, 15.5 percent; (Cl+I), 48.5 percent. Required: C, 15.3 percent; (Cl+I), 48.3 percent.
(5) Residue containing $$Cl(CF_2CFCl)_5I+Cl(CF_2CFCl)_6I$$

39 percent. The residue from several runs was combined and distilled to give: $Cl(CF_2CFCl)_5I$, B.P. 185 to 190° C./ca. $10^{-1}$ mm. Hg absolute. $n_D^{20}$ 1.432. Found: C, 16.3 percent; (Cl+I), 45.3 percent. Required: C, 16.1 per-

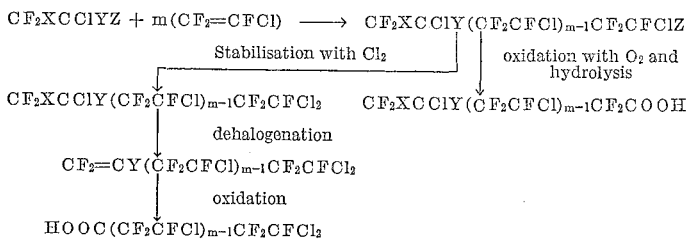

The carboxylic acid products of the present invention are strongly acidic and possess marked surface activity. They may be used as emulsifying agents in the polymerisation of fluoroolefins, as additives for petroleum products, e.g. as additives to lower the vapour pressure of gasoline and so prevent losses due to evaporation, and as additives to metal plating baths to cut down the vapour pressure of the electrolyte and reduce losses of valuable plating metals such as chromium. In the case of those acids which are highly fluorinated and/or chlorinated, a high degree of thermal stability and resistance to chemical attack is exhibited.

The invention will be further illustrated by reference to the following specific examples in which any references to "parts" are to be taken as parts by weight.

A. REACTION OF $CF_2ClCFClI$ WITH $CF_2=CFCl$

*Example A1.—Using ultraviolet light and a large excess of $CF_2ClCFClI$*

420 parts of $CF_2ClCFClI$ were sealed in a silica tube with 11.7 parts of $CF_2=CFCl$. Air and moisture were carefully excluded. The liquid phase was exposed to ultraviolet light for 5 days, during which time the tube was vigorously shaken. No chlorotrifluoroethylene remained. The liquid products were distilled to give:
(1) $CF_2ClCFClI$, B.P. 98 to 100° C.
(2) $CF_2ClCFClCF_2CFClI$, B.P. 80° C./25mm. Hg absolute. Yield: 75 percent based on $CF_2=CFCl$. Found: C, 12.1 percent; (Cl+I), 59.3 percent. Required: C, 12.1 percent; (Cl+I), 59.1 percent.

cent; (Cl+I), 45.6 percent. $Cl(CF_2CFCl)_6I$, B.P. 200 to 208° C./ca $10^{-2}$ mm. Hg absolute. $n_D^{20}$ 1.428. Found: C, 16.8 percent; (Cl+I), 43.0 percent. Required: C, 16.8 percent; (Cl+I), 43.6 percent.

*Example A3.—Using ultraviolet light and an excess of $CF_2=CFCl$*

29.2 parts of $CF_2=CFCl$ and 14 parts of $CF_2ClCFClI$ were sealed in a silica tube. The vapor phase was blacked out and the liquid phase was irradiated for three days while shaking. Distillation of the products from two such runs gave:

| | Percent |
|---|---|
| (1) $CF_2ClCFClI$ | 0 |
| (2) $Cl(CF_2CFCl)_2I$ | 5 |
| (3) $Cl(CF_2CFCl)_3I$ | 7 |
| (4) $Cl(CF_2CFCl)_4I$ | 11 |
| (5) $Cl(CF_2CFCl)_5I$ | 13 |
| (6) $Cl(CF_2CFCl)_6I$ | 12 |
| (7) $Cl(CF_2CFCl)_7I$ | 12 |

B.P. 230 to 240° C./ca. $10^{-3}$ mm. Hg absolute. Found: C, 17.2 percent; (Cl+I), 41.9 percent. Required: C, 17.2 percent; (Cl+I), 42.0 percent.

At this point iodine began to be liberated with the high temperature used. The residue was therefore transferred to a molecular distillation unit and fractions taken off arbitrarily, using bath temperature control to achieve fractionation. This was successful for the isolation of the next four members of the polymer series:

(8) Cl(CF$_2$CFCl)$_8$I, 7 percent. Found: C, 17.5 percent. Required: C, 17.5 percent.
(9) Cl(CF$_2$CFCl)$_9$I, 4 percent. Found: C, 17.7 percent. Required: C, 17.8 percent.
(10) Cl(CF$_2$CFCl)$_{10}$I, 5 percent. Found: C, 18.0 percent. Required: C, 18.1 percent.
(11) Cl(CF$_2$CFCl)$_{11}$I, 4 percent. Found: C, 18.4 percent. Required: C, 18.3 percent.
(12) Residue, 16 percent. This was colourless, but turned pink upon exposure to ultraviolet light. A qualitative test for iodine was strongly positive. When cold the residue was a hard wax, but was quite mobile when hot. It was analyzed as follows:

Cl(CF$_2$CFCl)$_{20}$I, average composition. Found: C, 19.4 percent; (Cl+I), 34.0 percent. Required: C, 19.2 percent; (Cl+I), 35.0 percent.

The distillation is very difficult to carry out if a clean-cut separation of individual members of the polymer series is required. Oxygen must be excluded, since the compounds are extremely sensitive to oxidation, particularly in the presence of light. In an inert atmosphere the compounds are thermally quite stable, much more so than CF$_2$ClCFClI, which liberates iodine at temperatures of 120° C. and above. This compound contains chlorine on the carbon atom adjacent to the —CClI group, and this increases stability. The polymers contain the —CF$_2$CFClI group.

*Example A4.—Using benzoylperoxide as initiator*

Three grams of benzoyl peroxide were carefully dissolved in 150 ml. of 1,2-dichloro-1-iodo-1,2,2-trifluoroethane, in a 300 milliliter stainless steel autoclave. The autoclave was cooled in a dry ice acetone bath and pumped free of air with an oil pump. 26 grams of chlorotrifluoroethylene was frozen in liquid air, pumped free of air with an oil pump, and then distilled into the autoclave. The autoclave was heated in an oil bath at a temperature of 120°C. for 3 hours and 40 minutes. The autoclave was then removed from the oil bath, cooled to room temperature and vented. The unreacted materials were removed by distillation and the still residue was collected as the desired polymer. The yield was 26.8 grams. Ultraviolet spectroscopic examination of the polymer indicated the average formula Cl(CF$_2$CFCl)$_8$I.

*Example A5.—Variation of Example A4*

Using the technique described in connection with Example A4, a second run was made using 150 milliliters of CF$_2$ClCFClI, 40 grams of CF$_2$=CFCl, and 3 grams of benzoyl peroxide, at a temperature of from 100 to 110° C. for a time of 4 hours. 38.3 grams of the polymer were recovered. Ultraviolet spectroscopic analysis indicated the average structure Cl(CF$_2$CFCl)$_8$I.

*Example 6A.—Variation of Example A4*

The experiment of Example A4 was repeated using 150 grams of CF$_2$ClCFClI, 61.5 grams of CF$_2$=CFCl, and 6 grams of benzoyl peroxide, at a temperature of 120° C. for 3 hours. 55.7 grams of the product were recovered. Analysis of the product indicated a similar polymer to those of Examples A4 and A5.

*Example A7.—Using heat without initiator*

The conditions of Example A4 were repeated using 150 milliliters of CF$_2$ClCFClI, and 60.5 grams of CF$_2$=CFCl. No initiator was used in this run. The temperature was raised to between 200 and 220° C. The reaction was carried out for 11 hours. 56 grams of polymer were recovered having substantially the same average structure indicated previously.

*Example A8.—Variation of Example A7*

In this case 150 grams of CF$_2$ClCFClI, and 60 grams of CF$_2$=CFCl were used with no initiator. Conditions are otherwise as described in Example A4, except that the temperature was held at 185° C. and the reaction was continued for only 2.17 hours. 49 grams of polymer were obtained. The polymer product —Cl(CF$_2$CFCl)$_n$I consisted mainly of polymers containing between four and twelve (CF$_2$CFCl) units.

*Example B1.—Monocarboxylic acid by oxidation of saturated iodine-containing 1:1 adduct using ultraviolet light and molecular oxygen.*

The adduct CF$_2$ClCFClCF$_2$CFClI (4.3 g.), prepared as described in Example A1, was sealed in a 200 ml. silica tube with oxygen (7 atm.) and 10% aqueous sodium hydroxide (20 ml.) and vigorously shaken in a horizontal position so that the organic liquid was distributed over the sides of the tube. The tube was exposed to a Hanovia ultraviolet light at 5 cm. distance from the tube. After 12 hr. the tube was opened and recharged with oxygen. After a further 12 hours it was opened and the excess of oxygen was pumped away. There was no residual organic layer. The aqueous solution was acidified with hydrochloric acid and extracted with ether. Distillation of the dried ethereal extract gave CF$_2$ClCFClCF$_2$CO$_2$H (63%), B.P. 105–107°/25 mm. (Found: C, 19.5%; Equiv. 250. C$_4$HO$_2$Cl$_2$F$_5$ requires C, 19.4% Equiv. 247).

*Example B2.—Monocarboxylic acid by oxidation of saturated iodine-containing polymer using ultraviolet light and molecular oxygen*

A long tube made of glass, permeable to ultraviolet radiation, having a capacity of 40 milliliters, was fitted with a condenser and an inlet tube for oxygen. The bottom portion of the tube was illuminated with an ultraviolet lamp. The tube was charged with 10.5 grams of the polymer from Example A8, 17 milliliters of perfluoromethylcyclohexane as solvent, and 16 milliliters of 20% aqueous sodium hydroxide. Oxygen was passed through the tube for 8.5 hours. The resulting mixture was diluted with water and the perfluoromethylcyclohexane was separated. The basic solution was acidified and extracted with ether. After evaporation of the ether, 2.5 grams of an acidic substance remained, having the structure Cl(CF$_2$CFCl)$_7$CF$_2$CO$_2$H A second neutral component was isolated from the perfluoromethylcyclohexane. This component, which contained no iodine and solidified to a waxy solid upon vacuum drying, probably resulted from the coupling of the polymer starting material.

I claim:

1. A method of forming a carboxylic acid salt of the formula CF$_2$XCClYR'COOM, where M is an alkali metal, which comprises reacting a compound of the formula CF$_2$XCClYR'CFClI, where X is selected from the group consisting of chlorine and fluorine, Y is selected from the group consisting of chlorine and fluorine, and R' represents an oxidation resistant chain having from 4 to 40 carbon atoms in a straight chain configuration, made up of repeating fluoroalkene units, less the terminal carbon atom of the last fluoroalkene unit, with molecular oxygen in the presence of the hydroxide of the alkali metal M, in admixture with water, in the presence of a free radical initiator.

2. The method of claim 1 wherein the reaction is carried out in the presence of ultraviolet light and the alkali metal hydroxide is sodium hydroxide.

(References on following page)

References Cited

UNITED STATES PATENTS

| | | | |
|---|---|---|---|
| 2,371,757 | 3/1945 | Henne | 260—539 |
| 2,387,247 | 10/1945 | Downing et al. | 260—653 |
| 2,403,207 | 7/1946 | Barrick | 260—539 X |
| 2,419,198 | 4/1947 | Bowman | 260—537 X |
| 2,469,290 | 5/1949 | Calfee et al. | 260—653 |
| 2,543,530 | 2/1951 | Kropa et al. | 260—653.3 |
| 2,554,219 | 5/1951 | Simons et al. | 260—653 |
| 2,559,752 | 7/1951 | Berry | 260—408 X |
| 2,668,864 | 2/1954 | Hals et al. | 260—653.3 |
| 2,670,387 | 2/1954 | Gottlieb et al. | 260—653.5 |
| 2,678,953 | 5/1954 | Conly | 260—653.8 |
| 2,695,880 | 11/1954 | Benning et al. | 260—92.1 X |
| 2,705,229 | 3/1955 | Ruh et al. | 260—653.5 |
| 2,712,554 | 7/1955 | Miller | 260—408 |
| 2,733,277 | 1/1956 | Miller | 260—653.3 |
| 2,777,004 | 1/1957 | Ruh et al. | 260—653.5 |
| 2,788,375 | 4/1957 | Ehrenfeld | 260—653.1 |
| 2,833,831 | 5/1958 | Haszeldine | 260—653.3 |
| 2,875,253 | 2/1959 | Barnhart | 260—653.1 |
| 2,880,247 | 3/1959 | Miller. | |
| 2,880,248 | 3/1959 | Miller. | |
| 2,898,382 | 8/1959 | Barnhart | 260—653.1 |
| 2,909,570 | 10/1959 | Wade et al. | 260—653.1 |
| 2,985,690 | 5/1961 | Miller. | |

OTHER REFERENCES

Fieser et al.: "Organic Chemistry" (1944), D.C. Heath and Company, Boston (pages 309 and 310 relied on).

Henne et al.: J. Am. Chem. Soc. 70, 130–132 (1948).

Henne et al.: "Ionization Constants of Fluorinated Acids," 76, J. Am. Chem. Soc. (Jan. 20, 1954) (pages 479–481).

Haszeldine: Jour. Chem. Soc. (London), 1952, pp. 4259–68.

Haszeldine: Jour. Chem. Soc. (London), 1955, pp. 4291–4302.

Simons: "Fluorine Chemistry," volumes I (1950), and II (1954), (volume I, pages 500–517) (volume II, pages 405–436).

LEON ZITVER, *Primary Examiner.*

ABRAHAM H. WINKELSTEIN, ABRAHAM RIMENS, ALPHONSO D. SULLIVAN, MILTON STERMAN, DANIEL D. HORWITZ, *Examiners.*

B. D. WIESE, S. H. BLECH, *Assistant Examiners.*